United States Patent
Cao et al.

(10) Patent No.: US 10,719,940 B2
(45) Date of Patent: Jul. 21, 2020

(54) TARGET TRACKING METHOD AND DEVICE ORIENTED TO AIRBORNE-BASED MONITORING SCENARIOS

(71) Applicant: BEIHANG UNIVERSITY, Beijing (CN)

(72) Inventors: Xianbin Cao, Beijing (CN); Xiantong Zhen, Beijing (CN); Yan Li, Beijing (CN); Xiaolong Jiang, Beijing (CN); Yutao Hu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 99 days.

(21) Appl. No.: 16/147,392

(22) Filed: Sep. 28, 2018

(65) Prior Publication Data

US 2020/0051250 A1    Feb. 13, 2020

(30) Foreign Application Priority Data

Aug. 8, 2018   (CN) .......................... 2018 1 0899198

(51) Int. Cl.
*G06T 7/20* (2017.01)
*G06T 7/194* (2017.01)
(Continued)

(52) U.S. Cl.
CPC .............. *G06T 7/20* (2013.01); *B64C 39/024* (2013.01); *G06T 7/11* (2017.01); *G06T 7/194* (2017.01);
(Continued)

(58) Field of Classification Search
CPC ..... G06T 7/20; G06T 7/70; G06T 7/11; G06T 7/194; G06T 2207/10016;
(Continued)

(56) References Cited

U.S. PATENT DOCUMENTS

| | | | |
|---|---|---|---|
| 9,075,415 B2 * | 7/2015 | Kugelmass | ............ G05D 1/101 |
| 2009/0141993 A1 | 7/2009 | Ma | |

(Continued)

FOREIGN PATENT DOCUMENTS

| | | |
|---|---|---|
| CN | 103473542 A | 12/2013 |
| CN | 104112282 A | 10/2014 |

(Continued)

OTHER PUBLICATIONS

Radovic, M., Adarkwa, O., & Wang, Q. (2017). Object recognition in aerial images using convolutional neural networks. Journal of Imaging, 3(2) doi:http://dx.doi.org/10.3390/jimaging3020021.*

(Continued)

*Primary Examiner* — Neil R McLean
(74) *Attorney, Agent, or Firm* — J.C. Patents

(57) ABSTRACT

The present disclosure provides a target tracking method and device oriented to airborne-based monitoring scenarios. The method includes: obtaining a video to-be-tracked of the target object in real time; extracting a first frame and a second frame; trimming and capturing the first frame to derive an image for first interest region; trimming and capturing the second frame to derive an image for target template and an image for second interest region; inputting the image for target template and the image for first interest region into an appearance tracker network to derive an appearance tracking position; inputting the image for first interest region and the image for second interest region into a motion tracker network to derive a motion tracking position; and finally inputting the appearance tracking position and the motion tracking position into a deep integration network to derive a final tracking position.

10 Claims, 4 Drawing Sheets

(51) Int. Cl.
*G06T 7/11* (2017.01)
*G06T 7/70* (2017.01)
*B64C 39/02* (2006.01)

(52) U.S. Cl.
CPC .......... *G06T 7/70* (2017.01); *B64C 2201/123* (2013.01); *B64C 2201/127* (2013.01)

(58) Field of Classification Search
CPC . G06T 2207/20081; G06T 2207/20084; G06T 7/246; B64C 39/024; B64C 2201/127; B64C 2201/123; G06N 3/0454
See application file for complete search history.

(56) References Cited

U.S. PATENT DOCUMENTS

2016/0379055 A1* 12/2016 Loui .................. G06K 9/00765
382/103
2018/0322749 A1* 11/2018 Kempel ............. G08B 13/1965
2019/0304105 A1* 10/2019 Gao ........................ G06T 7/248

FOREIGN PATENT DOCUMENTS

| CN | 107818573 A | 3/2018 |
| CN | 107862705 A | 3/2018 |
| CN | 108053419 A | 5/2018 |
| CN | 108133489 A | 6/2018 |
| CN | 108182388 A | 6/2018 |

OTHER PUBLICATIONS

First Office Action of prior Chinese application.
Fully-Convolutional Siamese Networks for Object Tracking.
Online Multi-Object Tracking Using Hierarchical Constraints for Complex Scenarios.
Robust Visual Tracking via Collaborative Motion and Appearance Model.

* cited by examiner

TARGET TRACKING METHOD AND DEVICE ORIENTED TO AIRBORNE-BASED MONITORING SCENARIOS

CROSS-REFERENCE TO RELATED APPLICATION

This application claims priority to Chinese Patent Application No. 201810899198.X, filed on Aug. 8, 2018, which is hereby incorporated by reference in its entirety.

TECHNICAL FIELD

The present disclosure relates to the field of computer technology, and in particular, to a target tracking method and device oriented to airborne-based monitoring scenarios.

BACKGROUND

Target detecting and tracking are two of the core tasks in the field of visual surveillance. The tracking aims to achieve precise positioning of a target in video successive frames to derive a target trajectory, which has extremely high application value in practical oriented airborne-based monitoring scenarios.

In traditional visual monitoring methods, the monitoring data is often captured by using a horizontal visual angle or a low visual angle camera that is fixedly arranged. With the rapid development of Unmanned Aerial Vehicle (UAV) technology in recent years, the monitoring based on data from drone-mounted airborne-based camera is growing in popularity and importance. Such airborne-based monitoring data has the advantages of higher visual angle, less concealment, larger coverage area, quick and flexible deployment and low maintenance cost, etc. At the same time, however, many challenges have been raised for target tracking methods based on such surveillance video.

However, the high visual angle of the monitoring data based on the drone-mounted airborne-based camera data tends to result in a small target dimension and insufficient appearance information. Additionally, the flexible and maneuverable deployment of the airborne-based platform leads to variable and unpredictable types of targets that may occur in the monitoring scenarios. Moreover, the mobility of the airborne-based platform can enable the captured surveillance video to contain a certain lens motions, thereby affecting the reliability of the target motion features in the video.

SUMMARY

The present disclosure provides a target tracking method and device oriented to airborne-based monitoring scenarios in order to address the technical problem that the high visual angle of the monitoring data based on the drone-mounted airborne-based camera data tends to result in a small target dimension and insufficient appearance information; that the flexible and maneuverable deployment of the airborne-based platform leads to variable and unpredictable types of targets that may occur in the monitoring scenarios; and that the captured surveillance video can contain a certain of lens motions, thereby affecting the reliability of the target motion features in the video.

In a first aspect, the present disclosure provides a target tracking method oriented to airborne-based monitoring scenarios, including:

obtaining a video to-be-tracked of a target object in real time, and performing frame decoding to the video to-be-tracked so as to extract a first frame and a second frame, wherein the first frame is an image frame corresponding to a current time, and the second frame is a frame previous to the first frame;

trimming and capturing the first frame to derive an image for first interest region, and trimming and capturing the second frame to derive an image for target template and an image for second interest region;

inputting the image for target template and the image for first interest region into a preset appearance tracker network to derive an appearance tracking position, and inputting the image for first interest region and the image for second interest region into a preset motion tracker network to derive a motion tracking position; and inputting the appearance tracking position and the motion tracking position into a deep integration network to derive an integrated final tracking position.

In a possible design, after the inputting the appearance tracking position and the motion tracking position into a deep integration network to derive an integrated final tracking position, the method further includes:

displaying and outputting a final tracking result in the first frame according to the final tracking position.

In a possible design, the final tracking result is a first rectangular bounding box displayed in the first frame, wherein the first rectangular bounding box is used to represent a current position of the target object.

In a possible design, the trimming and capturing the first frame to derive an image for first interest region includes:

trimming and capturing the first frame to derive the image for first interest region according to a center coordinate of the first rectangular bounding box and a third rectangular bounding box in the first frame, wherein a center of the first rectangular bounding box coincides with a center of the third rectangular bounding box, and a length and width data of the third rectangular bounding box are N times that of a length and width data of the first rectangular bounding box, respectively, wherein N is a natural number greater than 1.

In a possible design, the trimming and capturing the second frame to derive an image for target template and an image for second interest region includes:

trimming and capturing to derive the image for target template according to a coordinate position of an upper left corner of the second rectangular bounding box and a length and width data of the second rectangular bounding box in the second frame; and trimming and capturing the second frame to derive the image for second interest region according to a center coordinate of the second rectangular bounding box and a fourth rectangular bounding box in the second frame, wherein a center of the second rectangular bounding box coincides with a center of the fourth rectangular bounding box, and a length and width data of the fourth rectangular bounding box are N times that of a length and width data of the second rectangular bounding box, respectively.

In a possible design, the inputting the image for target template and the image for first interest region into a preset appearance tracker network to derive an appearance tracking position includes:

separately and symmetrically inputting the image for target template and the image for first interest region into the appearance tracker network to perform equivalent convolution operations in parallel to derive a hierarchical feature pyramid, wherein the appearance tracker network implements a twin convolutional neural network structure;

cascading and integrating feature maps derived from different convolutional layers in parallel two streams of twin networks using the hierarchical feature pyramid while the convolution deepens continuously, respectively;

setting a feature map, which is derived by cascading and integrating one stream corresponding to the image for target template, to be a kernel, and using the kernel to perform a cross-correlation calculation for dense sampling with sliding window type on a feature map, which is derived by cascading and integrating one stream corresponding to the image for first interest region, and deriving a response map for appearance similarity; and calculating, at each sliding window position, an appearance similarity between the image for target template and a searched position of the image for first interest region, wherein a position where the appearance similarity response is the highest is the appearance tracking position.

In a possible design, the inputting the image for first interest region and the image for second interest region into a preset motion tracker network to derive a motion tracking position includes:

inputting the image for first interest region and the image for second interest region, respectively, into a contrast map generating module to derive a first contrast map and a second contrast map;

inputting the first contrast map and the second contrast map into a filtering frame difference module to derive a frame difference motion response map from the image for first interest region and the image for second interest region;

inputting the frame difference motion response map into a foreground enhancing module and a background suppressing module to derive a foreground feature map and a background feature map, respectively;

differencing the foreground feature map and the background feature map pixel-by-pixel to derive a motion tracking position response map, and determining the motion tracking position according to the motion tracking position response map.

In a possible design, the inputting the appearance tracking position and the motion tracking position into a deep integration network to derive an integrated final tracking position includes:

inputting the appearance tracking position and the motion tracking position into the deep integration network, and integrating the appearance tracking position with the motion tracking position to derive a final tracking position response map;

performing dimensionality reduction on the tracking position response map to derive a first vector, which is an one-dimensional vector;

inputting the first vector into a two Relu activated fully-connected layers to derive an output of four-dimensional bounding box data by regression, wherein the four-dimensional bounding box data includes: horizontal coordinates of an upper left corner of the first rectangular bounding box, vertical coordinates of the upper left corner of the first rectangular bounding box, a length of the first rectangular bounding box, and a width of the first rectangular bounding box.

In a possible design, the appearance tracker network, the motion tracker network and the deep integration network are all structured to be convolutional neural networks which are all trained by means of end-to-end offline training.

In a second aspect, the present disclosure further provides a target tracking device oriented to airborne-based monitoring scenarios, including:

a video frame extracting module, configured to obtain a video to-be-tracked of a target object in real time, and performing frame decoding to the video to-be-tracked so as to extract a first frame and a second frame, wherein the first frame is an image frame corresponding to a current time, and the second frame is a frame previous to the first frame;

an image capturing module, configured to trim and capture the first frame to derive an image for first interest region, and trim and capture the second frame to derive an image for target template and an image for second interest region;

a position calculating module, configured to input the image for target template and the image for first interest region into a preset appearance tracker network to derive an appearance tracking position, and input the image for first interest region and the image for second interest region into a preset motion tracker network to derive a motion tracking position; and a position integrating module, configured to input the appearance tracking position and the motion tracking position into a deep integration network to derive an integrated final tracking position.

In a possible design, the target tracking device oriented to airborne-based monitoring scenarios further includes:

a target restoring module, configured to display and output a final tracking result in the first frame according to the final tracking position.

In a possible design, the final tracking result is a first rectangular bounding box displayed in the first frame, wherein the first rectangular bounding box is used to represent a current position of the target object.

In a possible design, the image capturing module is specifically configured to:

trim and capture the first frame to derive the image for first interest region according to a center coordinate of the first rectangular bounding box and a third rectangular bounding box in the first frame, wherein a center of the first rectangular bounding box coincides with a center of the third rectangular bounding box, and a length and width data of the third rectangular bounding box are N times that of a length and width data of the first rectangular bounding box, respectively, wherein N is a natural number greater than 1.

In a possible design, the image capturing module is specifically configured to:

trim and capture to derive the image for target template according to a coordinate position of an upper left corner of the second rectangular bounding box and the length and width data of the second rectangular bounding box in the second frame; and trim and capture the second frame to derive the image for second interest region according to a center coordinate of the second rectangular bounding box and a fourth rectangular bounding box in the second frame, wherein a center of the second rectangular bounding box coincides with a center of the fourth rectangular bounding box, and a length and width data of the fourth rectangular bounding box are N times that of a length and width data of the second rectangular bounding box, respectively.

In a possible design, the position calculating module is specifically configured to:

separately and symmetrically input the image for target template and the image for first interest region into the appearance tracker network to perform equivalent convolution operations in parallel to derive a hierarchical feature pyramid, wherein the appearance tracker network implements a twin convolutional neural network structure;

cascade to fuse feature maps derived from different convolutional layers in parallel two streams of twin networks using the hierarchical feature pyramid while the convolution deepens continuously, respectively;

set a feature map, which is derived by cascading and integrating one stream corresponding to the image for target template, to be a kernel, and use the kernel to perform a cross-correlation calculation for dense sampling with sliding window type on a feature map, which is derived by cascading and integrating one stream corresponding to the image for first interest region, and derive a response map for appearance similarity; and calculate, at each sliding window position, an appearance similarity between the image for target template and a searched position of the image for first interest region, wherein a position where the appearance similarity response is the highest is the appearance tracking position.

In a possible design, the position calculating module is specifically configured to:

input the image for first interest region and the image for second interest region, respectively, into a contrast map generating module to derive a first contrast map and a second contrast map;

input the first contrast map and the second contrast map into a filtering frame difference module to derive a frame difference motion response map from the image for first interest region and the image for second interest region;

input the frame difference motion response map into a foreground enhancing module and a background suppressing module to derive a foreground feature map and a background feature map, respectively;

difference the foreground feature map and the background feature map pixel-by-pixel to derive a motion tracking position response map, and determine the motion tracking position according to the motion tracking position response map.

In a possible design, the position integrating module is specifically configured to:

input the appearance tracking position and the motion tracking position into a deep integration network, and fuse the appearance tracking position with the motion tracking position to derive a final tracking position response map;

perform dimensionality reduction on the tracking position response map to derive a first vector, which is an one-dimensional vector;

input the first vector into a two Relu activated fully-connected layers to derive an output of four-dimensional bounding box data by regression, wherein the four-dimensional bounding box data includes: horizontal coordinates of an upper left corner of the first rectangular bounding box, vertical coordinates of the upper left corner of the first rectangular bounding box, a length of the first rectangular bounding box, and a width of the first rectangular bounding box.

In a possible design, the appearance tracker network, the motion tracker network and the deep integration network are all structured to be convolutional neural networks which are trained by means of end-to-end offline training.

The target tracking method and device oriented to airborne-based monitoring scenarios disclosed by the present disclosure uses two streams tracker networks in parallel in the process of tracking the target object, wherein the target object's appearance and motion information are used to perform the positioning and tracking for the target object, and the final tracking position is derived by integrating two times positioning information. In the aspect of the appearance information, the tracking result of the target object in the second frame is captured in an image as the image for target template and is inputted into the appearance tracker network together with the image for first interest region which is captured by the target object in the first frame and can potentially occur for the target object. The tracking position of the target object in the second frame is derived by the matching search based on the appearance similarity. Meanwhile, in the aspect of motion information, the image for first interest region which is captured by the target object in the first frame is inputted into the appearance tracker network together with the image for second interest region which is captured at an equivalent position in the second frame. The tracking position of the motion target in the second frame is derived by learnable frame differencing based motion detection method. Finally, two times tracking results are integrated to derive the final tracking position of the target in the second frame, thereby achieving the tracking for the target object in real time.

BRIEF DESCRIPTION OF THE DRAWINGS

In order to more clearly illustrate the embodiments of the present disclosure or the technical solutions in the prior art, the drawings used in the embodiments or the prior art description will be briefly described below. Obviously, the drawings in the following description are some embodiments of the present disclosure. For those of ordinary skill in the art, they can obtain other drawings without any creative work based on these drawings.

DETAILED DESCRIPTION OF THE EMBODIMENTS

In order to make the purposes, technical solutions and advantages of the embodiments of the present disclosure more clearly, the technical solutions of the embodiments of the present disclosure are described clearly and completely in conjunction with the accompanying drawings in the embodiments of the present disclosure as follows. Apparently, the described embodiments are merely a part of but not all of the embodiments of the present disclosure. Based on the embodiments of the present disclosure, all of other embodiments obtained by those of ordinary skill in the art without any creative work belong to the scope of the present disclosure.

The present disclosure provides a target tracking method oriented to airborne-based monitoring scenarios, which can be used for scene monitoring and supervising based on a video captured by an unmanned aerial vehicle. For a specific application scenario, the target tracking method provided by the present disclosure can be employed in different application scenarios, such as urban security, traffic control, street patrol and key area monitoring, which has features of large monitoring coverage area, low labor cost, flexible deployment and control, etc.

Figure 1:
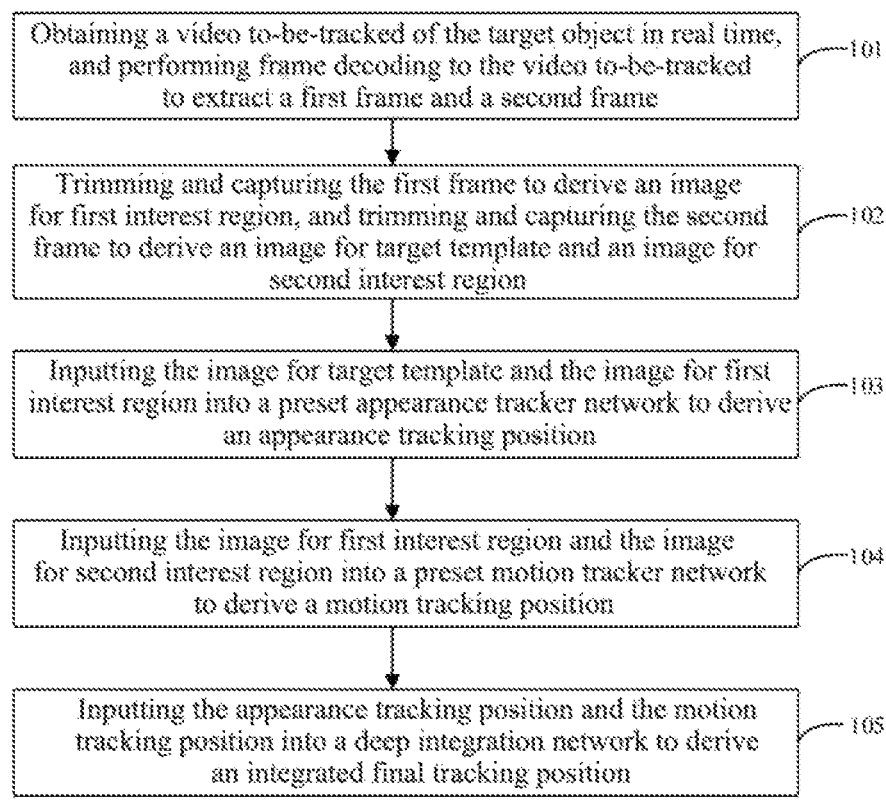
FIG. 1 is a flowchart diagram illustrating a target tracking method oriented to airborne-based monitoring scenarios according to an exemplary embodiment of the present disclosure.

FIG. 1 is a flowchart diagram illustrating a target tracking method oriented to airborne-based monitoring scenarios according to an exemplary embodiment of the present disclosure. As shown in FIG. 1, the target tracking method oriented to airborne-based monitoring scenarios provided by the present embodiment includes:

Step 101: obtaining a video to-be-tracked of the target object in real time, and performing frame decoding to the video to-be-tracked to extract a first frame and a second frame.

Specifically, a camera on an unmanned aerial vehicle may be used to obtain the video to-be-tracked of the target object in real time, and perform frame decoding to the video to-be-tracked to extract the first frame and the second frame, wherein the first frame is an image frame corresponding to a current time, and the second frame is a frame previous to the first frame;

Step 102: trimming and capturing the first frame to derive an image for first interest region, and trimming and capturing the second frame to derive an image for target template and an image for second interest region.

Specifically, it is possible to trim and capture the first frame to derive the image for first interest region according to a center coordinate of the first rectangular bounding box and a third rectangular bounding box in the first frame, wherein a center of the first rectangular bounding box coincides with a center of the third rectangular bounding box, and a length and width data of the third rectangular bounding box are N times that of a length and width data of the first rectangular bounding box, respectively, wherein N is a natural number greater than 1. Additionally, the final tracking result is a first rectangular bounding box displayed in the first frame, wherein the first rectangular bounding box is used to represent a current position of the target object.

Additionally, a trimming and capturing is performed to derive the image for target template according to a coordinate position of an upper left corner of the second rectangular bounding box and the length and width data of the second rectangular bounding box in the second frame. The second frame is trimmed to derive the image for second interest region according to a center coordinate of the second rectangular bounding box and a fourth rectangular bounding box in the second frame, wherein a center of the second rectangular bounding box coincides with a center of the fourth rectangular bounding box, and a length and width data of the fourth rectangular bounding box are N times that of a length and width data of the second rectangular bounding box, respectively.

Optionally, N may be 2, that is, the length and width data of the third rectangular bounding box are 2 times that of the length and width data of the first rectangular bounding box, respectively. In the second frame image, the image for target template is trimmed and captured from the original image according to a final tracking result rectangular box in the second frame. The bounding box used for capturing the image for interest region is centered on the center position of the bounding box used for capturing the corresponding image for target template. The length and width are expanded to 2 times that of the original data, obtaining a bounding box with an area 4 times that of the original data. According to the smoothness assumption of motions, it is believed that the position of the target object in the first frame must be found in the interest region that the area has been expanded. Therefore, the tracking task is simplified to searching for a positioning target in this limited interest region. The bounding box used for capturing the image for interest region of the first frame and the bounding box used for capturing the image for interest region of the second frame are the same, wherein the bounding box is derived by enlarging the final tracking position bounding box for the target in the second frame according to the above method. By using this bounding box, the image for interest regions of the first frame and the second frame can be derived by trimming and capturing from the original images of the second frame and the first frame, respectively.

Additionally, since the size of the first position bounding box is different for each of the frames while the input for the networks requires the dimensions to be unified, the captured images need to perform the enlargement and the reduction to uniform the dimensions. The dimension of the image for target template can be unified to 64*64, and the dimension of the image for interest region can be unified to 128*128.

Step 103: inputting the image for target template and the image for first interest region into a preset appearance tracker network to derive an appearance tracking position.

Specifically, the image for target template and the image for first interest region may be inputted into the appearance tracker network. When the image for target template and the image for first interest region have been processed in advance, the image for target template that has performed the enlargement and the reduction and the image for first interest region may be inputted into the appearance tracker network.

The network implements a twin convolutional neural network structure. The image for target template and the image for first interest region are separately and symmetrically inputted into the appearance tracker network to perform equivalent convolution operations in parallel to derive a hierarchical feature pyramid. The convolutional network may include six convolutional layers, all of which are activated by Relu, and the number of channels for outputting the feature map is 6, 12, 24, 36, 48, and 64 in sequence. The convolution kernel dimension of each layer is 7*7, 5*5 in sequence, and 3*3 for the rest. To ensure the integrity of the spatial position information in the feature map, the convolutional network does not include any down-sampling pooling layer. Feature maps derived from different convolutional layers in the parallel two streams of the twin networks are cascaded and integrated using the hierarchical feature pyramid of the convolutional neural network while the convolution deepens continuously, respectively. As the network deepens, respectively, the dimension of this integrated feature space is gradually enlarged, inclining more to a semantic level appearance feature representation. Then, the feature map, which is derived by integrating one stream corresponding to the image for target template, is treated as a kernel. This kernel is used for performing a cross-correlation calculation for dense sampling with sliding window type on the feature map, which is derived by cascading and integrating one stream corresponding to the image for first interest region, and a response map for appearance similarity is also derived. The sliding window cross-correlation calculation occurs on the feature maps of multiple convolution hierarchies, achieving multi-scale search and deriving multiple similarity response maps. The final appearance tracking response map is derived by integrating the similarity maps at each of the hierarchies. It can be seen that in the appearance tracker network, the tracking is in essence about deriving the position where the target is located by a multi-scale dense sliding window search in the interest region. The search is calculated based on the target appearance similarity, that is, the appearance similarity between the target template and the image of the searched position is calculated at each sliding window position. The position where the similarity response is large is highly probably the position where the target is located.

Step 104: inputting the image for first interest region and the image for second interest region into a preset motion tracker network to derive a motion tracking position.

Specifically, in parallel with the appearance tracking network, the motion tracker network is constructed to be a convolutional neural network structure which can provide, by training, a learnable frame differencing based motion area detector. The position of the motion target is derived by detecting the motion in the interest region of the current frame. The motion tracking network is formed by cascading a contrast map generating module, a Spotlight filter frame difference module, a foreground enhancing and background suppressing module in sequence, wherein each module is constructed based on a convolutional neural network structure. As a start, image for second interest region of the first frame and image for second interest region of the second frame, respectively, are inputted into the contrast map generating module. The module includes three layers cascaded and Relu activated convolutional layers. The dimensions of the convolution kernels are 11*11, 5*5, 3*3 in sequence. Each of the number of outputted feature maps channel is three, wherein the feature map is the contrast map for the input image derived from the calculations. Furthermore, the first and image for second interest regions and the contrast map of the image for second interest region are inputted into the Spotlight filter frame difference module to obtain a frame difference motion response map corresponding to the interest regions of two frames comprising previous frame and subsequent frame. The purpose of replacing original image with the contrast map for performing the frame difference calculation is to reduce the motion noise response caused by lens motions. The module first subtracts the inputted two contrast images pixel by pixel to derive the original frame difference response map, and then inputs the map into three parallel convolutional layers, wherein the size of the convolution kernel are 3*3, 5*5 and 7*7, respectively. The three convolution output feature maps are then integrated to derive an integrated frame difference response map. This multi-scale convolution design, which is derived by cascading and secondary integrating three convolutional layers with different kernel sizes, aims to filter the motion noises caused by the lens motions. Finally, the foreground enhancing module consists of three cascaded maximum pooling layers, and the background suppressing module consists of three cascaded average pooling layers. The size of the pooling layer kernels are 2*2, 4*4 and 6*6 in sequence. The purpose of this multi-scale design intends to accommodate motion response with different sizes. The frame difference response map is inputted into the two modules respectively for performing the differencing pixel by pixel on the output two feature maps so as to obtain the final response map for motion tracking position. Compared with response map for integrating frame difference, this response map achieves the suppression to the noise response introduced by lens motions and improve the accuracy and robustness for the motion detection.

Step 105: inputting the appearance tracking position and the motion tracking position into a deep integration network to derive an integrated final tracking position.

In order to achieve an intelligent integration for the appearance and the motion tracking position at the same time, the target tracking method provided by the present embodiment it to firstly stacking two single-channel tracking response map on the channel dimension, and then performs the convolution using a 1*1 convolution kernel to restore the output channel to a single channel, thereby teachably integrating the tracking results to derive the final tracking position response map.

Then, the two-dimensional response map is elongated to reduce its dimension so as to derive a first vector, wherein the first vector is one-dimensional vector, which is then inputted into two Relu activated fully-connected layers, and a four-dimensional bounding box data is derived by regression for outputting. The four-dimensional bounding box data includes: horizontal coordinates of an upper left corner of the first rectangular bounding box, vertical coordinates of the upper left corner of the first rectangular bounding box, a length of the first rectangular bounding box, and a width of the first rectangular bounding box.

This embodiment combines two streams tracker networks in parallel in the process of tracking the target object, wherein the target object's appearance and motion information are used to perform the positioning and tracking for the target object, and the final tracking position is derived by integrating two times positioning information. In the aspect of the appearance information, the tracking result of the target object in the second frame is captured in an image as the image for target template and is inputted into the appearance tracker network together with the image for first interest region which is captured by the target object in the first frame and can potentially occur for the target object. The tracking position of the target object in the second frame is derived by the matching search based on the appearance similarity. Meanwhile, in the aspect of motion information, the image for first interest region, which is captured by the target object in the first frame is inputted into the appearance tracker network together with the image for second interest region, which is captured at an equivalent position in the second frame. The tracking position of the motion target in the second frame is derived by learnable frame differencing based motion detection method. Finally, two times tracking results are integrated to derive the final tracking position of the target in the second frame, thereby achieving the tracking for the target object in real time.

Figure 2:
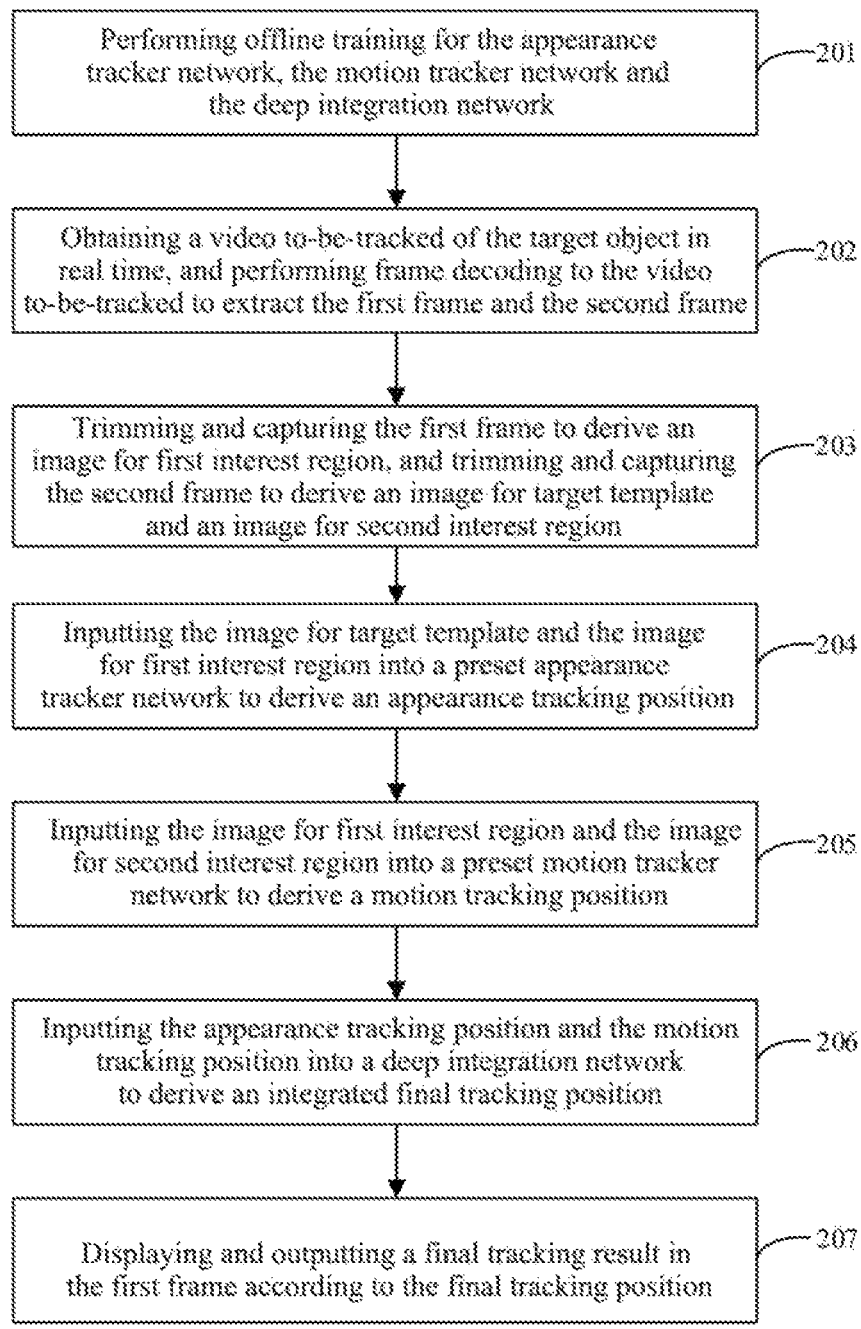
FIG. 2 is a flowchart diagram illustrating a target tracking method oriented to airborne-based monitoring scenarios according to another exemplary embodiment of the present disclosure.

FIG. 2 is a flowchart diagram illustrating a target tracking method oriented to airborne-based monitoring scenarios according to another exemplary embodiment of the present disclosure. As shown in FIG. 2, the target tracking method provided by the present embodiment includes:

Step 201: performing offline training for the appearance tracker network, the motion tracker network and the deep integration network.

Specifically, the appearance tracker network, the motion tracker network and the deep integration network are all convolutional neural network structures. In the target tracking method provided by the present embodiment, the end-to-end integrated training for the networks ensures the integrity and the synergy between the various parts of the tracker, realizing deep integration of the appearance and motion features. Meanwhile, the strategy of the target tracking method for training offline and testing online provided by the present embodiment ensures the timeliness of the tracking to fulfill the need for tracking in real time. During the offline training phase, training data is captured from a public tracking data set. A training sample includes a target template that is trimmed and undergone the enlargement and the reduction to a specified dimension, and a pair of images for interest region. The optimization purpose of the training is to minimize the mean square error loss function between the network output bounding box and the real bounding box.

Step 202: obtaining a video to-be-tracked of the target object in real time, and performing frame decoding to the video to-be-tracked to extract the first frame and the second frame.

Step 203: trimming and capturing the first frame to derive an image for first interest region, and trimming and capturing the second frame to derive an image for target template and an image for second interest region.

Step 204: inputting the image for target template and the image for first interest region into a preset appearance tracker network to derive an appearance tracking position.

Step 205: inputting the image for first interest region and the image for second interest region into a preset motion tracker network to derive a motion tracking position.

Step 206: inputting the appearance tracking position and the motion tracking position into a deep integration network to derive an integrated final tracking position.

It is deservedly mentioned that the specific implementation of Steps 202-206 may refer to the description of Steps 101-105 in the embodiment shown in FIG. 1, the details of which will not be repeated herein.

Step 207: displaying and outputting a final tracking result in the first frame according to the final tracking position.

Specifically, after the inputting the appearance tracking position and the motion tracking position into a deep integration network to derive an integrated final tracking position, displaying and outputting the final tracking result in the first frame according to the final tracking position. Optionally, displaying and outputting the final tracking result in the first frame according to the final tracking position, wherein the final tracking result is a first rectangular bounding box shown in the first frame. The first rectangular bounding box is used to represent a current position of the target object.

In view of the problem that high visual angle may lead to small target size and insufficient appearance information, this embodiment uses the method for combining the appearance and motion features to derive and utilize more abundant tracking information. Additionally, In view of the possibility that the flexible and maneuverable deployment may lead to variable and unpredictable types of targets coming into the monitoring scenarios, the method provided by the present embodiment constructs non-discriminating tracking method with high adaption. In the aspect of appearance features, the method for the matching search based on the appearance similarity is used, which learns the similarities between two entities rather than directly describes the appearance of the target. In the aspect of motion features, the motion detection based on frame difference itself has full adaption and generates response to any moving object indistinguishably. In addition, in view of the problem that the movement of the airborne-based platform can cause the captured video to include a certain of lens motions, which can affect the reliability of the target motion feature in the video. In order to solve the effect caused by lens motions, the method provided by the present embodiment uses the multi-dimensional convolution feature integration design for extracting and applying of the motion features, so that the camera movements may be diffused and filtered out via the spatial abstraction provided by the different sizes receptive fields. At the same time, the background suppressing module has been specifically deployed to control the noise effects of leans motions. Finally, in order to fulfill the need for tracking in real time, the tracker network in the method provided by the present embodiment adopts a fully offline training method, which eliminates the computing cost associated with online training and updating of the model, thereby significantly improving the timeliness of the method to meets the requirements of tracking in real time.

Figure 3:
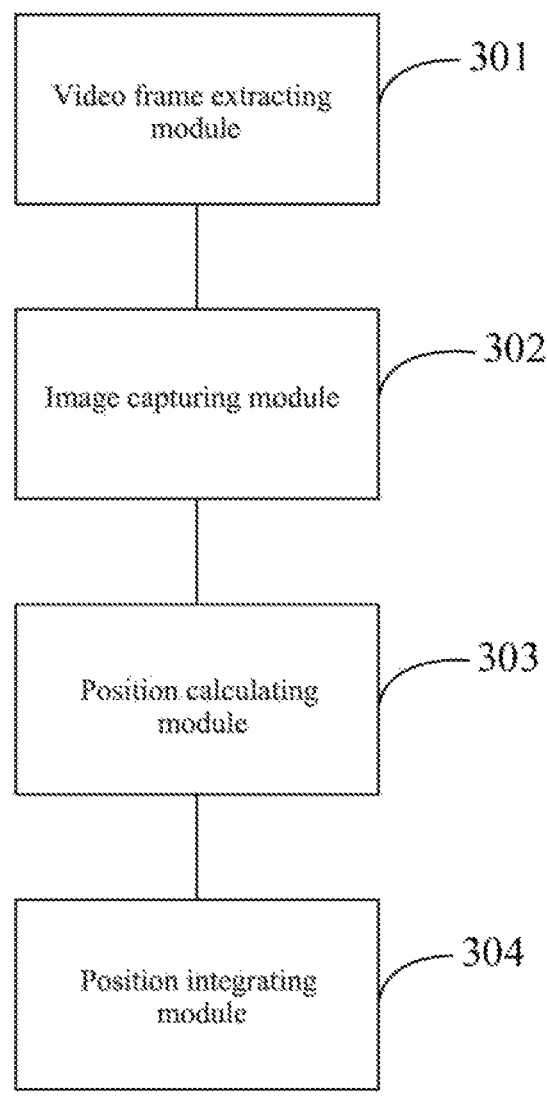
FIG. 3 is a structural diagram illustrating a target tracking device oriented to airborne-based monitoring scenarios according to an exemplary embodiment of the present disclosure.

FIG. 3 is a structural diagram illustrating a target tracking device oriented to airborne-based monitoring scenarios according to an exemplary embodiment of the present disclosure. The target tracking device provided by the present embodiment includes:

a video frame extracting module 301, configured to obtain a video to-be-tracked of a target object in real time, and performing frame decoding to the video to-be-tracked so as to extract a first frame and a second frame, wherein the first frame is an image frame corresponding to a current time, and the second frame is a frame previous to the first frame;

an image capturing module 302, configured to trim and capture the first frame to derive an image for first interest region, and trim and capture the second frame to derive an image for target template and an image for second interest region;

a position calculating module 303, configured to input the image for target template and the image for first interest region into a preset appearance tracker network to derive an appearance tracking position, and input the image for first interest region and the image for second interest region into a preset motion tracker network to derive a motion tracking position; and a position integrating module 304, configured to input the appearance tracking position and the motion tracking position into a deep integration network to derive an integrated final tracking position.

Figure 4:
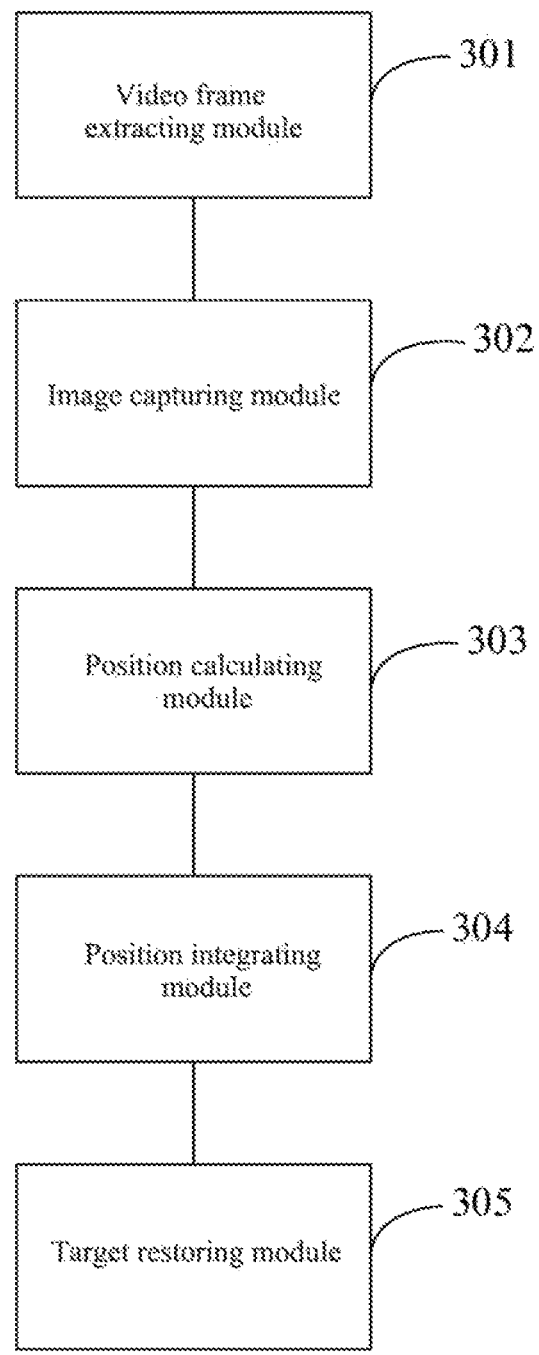
FIG. 4 is a structural diagram illustrating another target tracking device oriented to airborne-based monitoring scenarios according to an exemplary embodiment of the present disclosure.

On the basis of the embodiment shown in FIG. 3, FIG. 4 is a structural diagram illustrating another target tracking device according to an exemplary embodiment of the present disclosure. The target tracking device provided by the present embodiment further includes:

a target restoring module 305, configured to display and output a final tracking result in the first frame according to the final tracking position.

In a possible design, the final tracking result is a first rectangular bounding box displayed in the first frame, wherein the first rectangular bounding box is used to represent a current position of the target object.

In a possible design, the image capturing module 302 is specifically configured to:

trim and capture the first frame to derive the image for first interest region according to a center coordinate of the first rectangular bounding box and a third rectangular bounding box in the first frame, wherein a center of the first rectangular bounding box coincides with a center of the third rectangular bounding box, and a length and width data of the third rectangular bounding box are N times that of a length and width data of the first rectangular bounding box, respectively, wherein N is a natural number greater than 1.

In a possible design, the image capturing module 302 is specifically configured to:

trim and capture to derive the image for target template according to a coordinate position of an upper left corner of the second rectangular bounding box and the length and width data of the second rectangular bounding box in the second frame; and trim and capture the second frame to derive the image for second interest region according to a center coordinate of the second rectangular bounding box and a fourth rectangular bounding box in the second frame, wherein a center of the second rectangular bounding box coincides with a center of the fourth rectangular bounding box, and a length and width data of the fourth rectangular bounding box are N times that of a length and width data of the second rectangular bounding box, respectively.

In a possible design, the position calculating module 303 is specifically configured to:

separately and symmetrically input the image for target template and the image for first interest region into the appearance tracker network to perform equivalent convolution operations in parallel to derive a hierarchical feature pyramid, wherein the appearance tracker network implements a twin convolutional neural network structure;

cascade to fuse feature maps derived from different convolutional layers in parallel two streams of twin networks using the hierarchical feature pyramid while the convolution deepens continuously, respectively;

set a feature map, which is derived by cascading and integrating one stream corresponding to the image for target template, to be a kernel, and use the kernel to perform a cross-correlation calculation for dense sampling with sliding window type on a feature map, which is derived by cascading and integrating one stream corresponding to the image for first interest region, and derive a response map for appearance similarity; and calculate, at each sliding window position, an appearance similarity between the image for target template and a searched position of the image for first interest region, wherein a position where the appearance similarity response is the highest is the appearance tracking position.

In a possible design, the position calculating module 303 is specifically configured to:

input the image for first interest region and the image for second interest region, respectively, into a contrast map generating module to derive a first contrast map and a second contrast map;

input the first contrast map and the second contrast map into a filtering frame difference module to derive a frame difference motion response map from the image for first interest region and the image for second interest region;

input the frame difference motion response map into a foreground enhancing module and a background suppressing module to derive a foreground feature map and a background feature map, respectively;

difference the foreground feature map and the background feature map pixel-by-pixel to derive a motion tracking position response map, and determine the motion tracking position according to the motion tracking position response map.

In a possible design, the position integrating module 304 is specifically configured to:

input the appearance tracking position and the motion tracking position into a deep integration network, and fuse the appearance tracking position with the motion tracking position to derive a final tracking position response map;

perform dimensionality reduction on the tracking position response map to derive a first vector, which is an one-dimensional vector;

input the first vector into a two Relu activated fully-connected layers to derive an output of four-dimensional bounding box data by regression, wherein the four-dimensional bounding box data includes: horizontal coordinates of an upper left corner of the first rectangular bounding box, vertical coordinates of the upper left corner of the first rectangular bounding box, a length of the first rectangular bounding box, and a width of the first rectangular bounding box.

In a possible design, the appearance tracker network, the motion tracker network and the deep integration network are all structured to be convolutional neural networks which are trained by means of end-to-end offline training.

The target tracking devices oriented to airborne-based monitoring scenarios provided in the embodiments shown in FIG. 3 to FIG. 4 can be used for implementing the methods provided by the embodiments shown above in FIG. 2 to FIG. 3, and the specific implementation and technical effects are similar, and will not be repeated herein.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in each of the embodiments of the present disclosure.

What is claimed is:

1. A target tracking method oriented to an airborne-based monitoring scenarios, the method comprising:

obtaining a video to-be-tracked of a target object in real time, and performing frame decoding to the video to-be-tracked to extract a first frame and a second frame, wherein the first frame is an image frame corresponding to a current time, and the second frame is a frame previous to the first frame;

trimming and capturing the first frame to derive an image for first interest region, and trimming and capturing the second frame to derive an image for target template and an image for second interest region;

inputting the image for target template and the image for first interest region into a preset appearance tracker network to derive an appearance tracking position, and inputting the image for first interest region and the image for second interest region into a preset motion tracker network to derive a motion tracking position; and inputting the appearance tracking position and the motion tracking position into a deep integration network to derive an integrated final tracking position.

2. The target tracking method oriented to an airborne-based monitoring scenarios according to claim 1, wherein after the inputting the appearance tracking position and the motion tracking position into a deep integration network to derive an integrated final tracking position, the method further comprises:

displaying and outputting a final tracking result in the first frame according to the final tracking position.

3. The target tracking method oriented to an airborne-based monitoring scenarios according to claim 1, wherein the final tracking result is a first rectangular bounding box displayed in the first frame, wherein the first rectangular bounding box is used to represent a current position of the target object.

4. The target tracking method oriented to an airborne-based monitoring scenarios according to claim 3, wherein the trimming and capturing the first frame to derive an image for first interest region comprises:

trimming and capturing the first frame to derive the image for first interest region according to a center coordinate of the first rectangular bounding box and a third rectangular bounding box in the first frame, wherein a center of the first rectangular bounding box coincides with a center of the third rectangular bounding box, and a length and width data of the third rectangular bounding box are N times that of a length and width data of the first rectangular bounding box, respectively, wherein N is a natural number greater than 1.

5. The target tracking method oriented to an airborne-based monitoring scenarios according to claim 4, wherein the trimming and capturing the second frame to derive an image for target template and an image for second interest region comprises:
   trimming to derive the image for target template according to a coordinate position of an upper left corner of the second rectangular bounding box and a length and width data of the second rectangular bounding box in the second frame; and
   trimming and capturing the second frame to derive the image for second interest region according to a center coordinate of the second rectangular bounding box and a fourth rectangular bounding box in the second frame, wherein a center of the second rectangular bounding box coincides with a center of the fourth rectangular bounding box, and a length and width data of the fourth rectangular bounding box are N times that of a length and width data of the second rectangular bounding box, respectively.

6. The target tracking method oriented to an airborne-based monitoring scenarios according to claim 5, wherein the inputting the image for target template and the image for first interest region into a preset appearance tracker network to derive an appearance tracking position comprises:
   separately and symmetrically inputting the image for target template and the image for first interest region into the appearance tracker network to perform equivalent convolution operations in parallel to derive a hierarchical feature pyramid, wherein the appearance tracker network implements a twin convolutional neural network structure;
   cascading and integrating feature maps derived from different convolutional layers in parallel two streams of twin networks using the hierarchical feature pyramid while the convolution deepens continuously, respectively;
   setting a feature map, which is derived by cascading and integrating one stream corresponding to the image for target template, to be a kernel, and using the kernel to perform a cross-correlation calculation for dense sampling with sliding window type on a feature map, which is derived by cascading and integrating one stream corresponding to the image for first interest region, and deriving a response map for appearance similarity; and
   calculating, at each sliding window position, an appearance similarity between the image for target template and a searched position of the image for first interest region, wherein a position where the appearance similarity response is the highest is the appearance tracking position.

7. The target tracking method oriented to an airborne-based monitoring scenarios according to claim 6, wherein the inputting the image for first interest region and the image for second interest region into a preset motion tracker network to derive a motion tracking position comprises:
   inputting the image for first interest region and the image for second interest region, respectively, into a contrast map generating module to derive a first contrast map and a second contrast map;
   inputting the first contrast map and the second contrast map into a filtering frame difference module to derive a frame difference motion response map from the image for first interest region and the image for second interest region;
   inputting the frame difference motion response map into a foreground enhancing module and a background suppressing module to derive a foreground feature map and a background feature map, respectively;
   differencing the foreground feature map and the background feature map pixel-by-pixel to derive a motion tracking position response map, and determining the motion tracking position according to the motion tracking position response map.

8. The target tracking method oriented to an airborne-based monitoring scenarios according to claim 7, wherein the inputting the appearance tracking position and the motion tracking position into a deep integration network to derive an integrated final tracking position comprises:
   inputting the appearance tracking position and the motion tracking position into the deep integration network, and integrating the appearance tracking position with the motion tracking position to derive a final tracking position response map;
   performing dimensionality reduction on the tracking position response map to derive a first vector, which is an one-dimensional vector;
   inputting the first vector into a two Relu activated fully-connected layers to derive an output of four-dimensional bounding box data by regression, wherein the four-dimensional bounding box data comprises: horizontal coordinates of an upper left corner of the first rectangular bounding box, vertical coordinates of the upper left corner of the first rectangular bounding box, a length of the first rectangular bounding box, and a width of the first rectangular bounding box.

9. The target tracking method oriented to an airborne-based monitoring scenarios according to claim 8, wherein the appearance tracker network, the motion tracker network and the deep integration network are all structured to be convolutional neural networks which are all trained by means of end-to-end offline training.

10. A target tracking device oriented to airborne-based monitoring scenarios, the method comprising:
   a video frame extracting module, configured to obtain a video to-be-tracked of a target object in real time, and performing frame decoding to the video to-be-tracked so as to extract a first frame and a second frame, wherein the first frame is an image frame corresponding to a current time, and the second frame is a frame previous to the first frame;
   an image capturing module, configured to trim and capture the first frame to derive an image for first interest region, and trim and capture the second frame to derive an image for target template and an image for second interest region;
   a position calculating module, configured to input the image for target template and the image for first interest region into a preset appearance tracker network to derive an appearance tracking position, and input the image for first interest region and the image for second interest region into a preset motion tracker network to derive a motion tracking position; and
   a position integrating module, configured to input the appearance tracking position and the motion tracking position into a deep integration network to derive an integrated final tracking position.

* * * * *